United States Patent [19]

Ohshima

[11] Patent Number: 5,056,887
[45] Date of Patent: Oct. 15, 1991

[54] OPTICAL MIXING DEVICE

[75] Inventor: Shigeru Ohshima, Yokohama, Japan

[73] Assignee: Kabushiki Kaisha Toshiba, Kawasaki, Japan

[21] Appl. No.: 444,439

[22] Filed: Dec. 1, 1989

[30] Foreign Application Priority Data

Dec. 3, 1988 [JP] Japan .................................. 63-306656
Aug. 16, 1989 [JP] Japan .................................. 1-210850

[51] Int. Cl.$^5$ ...................... G02B 27/10; G02B 27/28; G02B 27/42
[52] U.S. Cl. ...................................... 385/36; 372/102; 359/487; 359/566; 359/638
[58] Field of Search ............... 350/96.12, 96.13, 96.19, 350/394, 401, 162.11, 162.17, 162.23, 347 V, 347 E, 347 R, 173; 372/102; 455/616

[56] References Cited

U.S. PATENT DOCUMENTS

| | | |
|---|---|---|
| 4,111,524 | 9/1978 | Tomlinson, III . |
| 4,278,327 | 7/1981 | McMahon et al. .............. 350/347 V |
| 4,478,494 | 10/1984 | Soref .................... 350/347 E |
| 4,741,588 | 5/1988 | Nicia et al. ........................ 350/96.19 |
| 4,784,470 | 11/1988 | Baker ...................... 350/347 V |
| 4,792,212 | 12/1988 | Baker ...................... 350/347 V |
| 4,813,769 | 3/1989 | Baker ...................... 350/347 E |
| 4,840,456 | 6/1989 | Fye ......................... 372/102 |

FOREIGN PATENT DOCUMENTS 0228888 7/1987 European Pat. Off. .
0251062 1/1988 European Pat. Off. .
0260745 3/1988 European Pat. Off. .

OTHER PUBLICATIONS

Shibutani et al., "Polarization Diversity Coherent Optical Receiver with a Balanced Receiver Configuration", *14th European Conference on Optical Communications,* pp. 151–154, not dated.

Tzeng et al., "Measurement of Excess Sensitivity Penalty of a Four-Diode Polarization Diversity Coherent Receiver", *Electronics Letters,* vol. 24, No. 6, 17 Mar. 1988, pp. 330 to 332.

Nishihara et al., "Holocoupler: A Novel Coupler for Optical Circuits", *IEEE Journal of Quantum Electronics,* Sep. 1975, pp. 794 to 796.

*Primary Examiner*—Paul M. Dzierzynski
*Assistant Examiner*—Martin Lerner
*Attorney, Agent, or Firm*—Cushman, Darby & Cushman

[57] ABSTRACT

In a device for mixing a first input optical signal and a second input optical signal, a polarization beam splitter receives the first and second input optical signals. Each of the first and second input optical signals is separated into polarized optical signals having different polarization planes. Each polarized optical signal is divided into divided optical signals being transmitted in directions with an acute crossed angle in a mixer which mixes the divided optical signals corresponding to the first and second input optical signals. The mixed optical signals are then focused.

14 Claims, 5 Drawing Sheets

OPTICAL MIXING DEVICE

BACKGROUND OF THE INVENTION

1. Field of the Invention

This invention relates to a device for mixing optical signals. More specifically, the invention relates to an optical mixing device for detecting a received optical signal, suitable for an optical receiver used in a coherent optical communication system.

2. Description of Related Art

In an optical receiving apparatus used in a coherent optical communication system, a polarization diversity system may be effective to compensate for polarization fluctuations of an optical signal. Also, a balanced receiver system improves the sensitivity of the receiver. Therefore, an optical mixing device has applied a balanced polarization diversity system which is a combination of the two systems.

FIG. 7 shows a known optical mixing device. A polarization beam splitter module 71 includes a polarization beam splitter 711 which separates an input optical signal S from an information source (not shown) through an optical fiber 72a into two optical signals. One separated optical signal is supplied to a first optical directional coupler 73a through an optical fiber 72b. The other separated optical signal is supplied to a second optical directional coupler 73b through an optical fiber 72c. A local oscillating module 74 generates a local oscillating optical signal which is supplied to a third optical directional coupler 73c. Third optical directional coupler 73c divides the local oscillating optical signal into two optical signals which are applied to first and second adjusters 75a and 75b for adjusting the polarization planes of the optical signals. Local oscillating optical signals, with their polarization planes adjusted by adjusters 75a and 75b, are supplied to first and second optical directional couplers 73a and 73b through optical fibers 72d and 72e.

First optical directional coupler 73a mixes the optical signal from optical fiber 72b and the local oscillating optical signal from optical fiber 72d to supply mixed signals to a first optical detecting module 76a through optical fibers 72f and 72g. Second optical directional coupler 73b mixes the optical signal from optical fiber 72c and the local oscillating optical signal from optical fiber 72e to supply mixed signals to a second optical detecting module 76b through optical fibers 72h and 72i. First and second optical detecting modules 76a and 76b include twin detectors to convert received optical signals into electrical signals.

In the device shown in FIG. 7, polarization beam splitter module 71, local oscillating module 74 and first and second optical detecting modules 76a and 76b are connected optically through optical fibers 72a to 72i and adjusters 75a and 75b. A final adjustment of the device is executed by adjusters 75a and 75b. This final adjustment makes the device more difficult to employ.

FIG. 8 shows a known balanced polarization diversity receiver comprising an optical mixing device. The receiver includes a polarization beam splitter (PBS) module 81 which has lenses 811a to 811j and polarization beam splitters PBS1 to PBS3. An input optical signal Ps, which can be considered to have two perpendicularly polarized components with intensities aPs and (1-a)Ps, is supplied to PBS1 through an optical fiber 82a and lens 811a which causes the optical signals to form a parallel beam.

A local oscillating optical signal PL, which has two perpendicular polarized components with adjusted equal intensities PL/2, is supplied to polarization beam splitter PBS1 through a polarization-maintaining optical fiber 82b and lens 811b. Polarization beam splitter PBS1 combines perpendicular polarized components of signals Ps and PL to produce mixed optical signals. Each of the mixed optical signals, which has two perpendicular polarized optical signals, is focused to each of polarization-maintaining optical fibers 82c and 82d by each of lenses 811c and 811d. Each of polarization-maintaining optical fibers 82c and 82d is twisted by 45 degrees between opposite ends. Thus, each of the output optical signals from lenses 811e and 811f has a polarization plane rotated by 45 degrees to that of input optical signals of optical fibers 82c and 82d. Output optical signals from lenses 811e and 811f are supplied to polarization beam splitters PBS2 and PBS3.

Polarization beam splitter PBS2 receives a mixed optical signal consisting of components of signals Ps and PL that were in the perpendicular polarization planes and divides that mixed signal into two optical signals in two perpendicular polarization planes, each having components of signals Ps and PL. Polarization beam splitter PBS3 receives a mixed optical signal consisting of components of signals Ps and PL that were in the perpendicular polarization planes and divides that mixed signal into two optical signals in two perpendicular polarization planes, each of the optical signals having components of signals Ps and PL. The optical signals from beam splitter PBS2 and PBS3 are applied to optical fibers 82e to 82h through lenses 811g to 811j. When the mixing of optical signals Ps and PL causes PBS2 to produce an optical signal of large magnitude, which PBS2 introduces to one of optical fibers 82e and 82f, PBS2 will introduce an optical signal of low magnitude to the other of optical fibers 82e and 82f. This means that a balanced receiver can be formed by using output optical signals from optical fibers 82e and 82f. Therefore, output optical signals from optical fibers 82e and 82f are introduced to pin-photodiodes 841 and 842 in PIN-AMP module 84 through optical connectors 85a and 85b and optical fibers 82i and 82j. Electrical signals from photodiodes 841 and 842 are combined and amplified by amplifier 843 to be detected in delay detector 86. Optical fibers 82e, 82f, 82i and 82j are necessary for coupling PBS2 and pin-photodiodes 841 and 842.

Output optical signals from optical fibers 82g and 82h are processed in PIN-AMP module 85, to be detected in delay detector 87, through optical connectors 85c and 85d and optical fibers 82k and 82l in the same manner as PIN-AMP module 84. Optical fibers 82g, 82h, 82k and 82l are necessary for coupling PBS3 and pin-photodiodes 851 and 852. An adder 88 combines the two detected signals from delay detectors 86 and 87 to produce output signals independent of the polarization of input optical signal Ps.

The devices shown in FIGS. 7 and 8 employ many optical fibers which are unstable to changes in temperature. Also, highly accurate adjustments of the optical axes of the optical fibers are necessary for connecting the optical fibers. Nevertheless, an increase of coupling loss due to fiber coupling is unavoidable. Moreover, in the device shown in FIG. 7, the optical length difference between optical fibers 72f and 72g must be within 1 mm. Also, the optical length difference between optical fibers 72h and 72i must be within 1 mm. In the device shown in FIG. 8, the difference between the optical length from polarization beam splitter PBS2 to photodiode 841 and the optical length from polarization beam splitter PBS2 to photodiode 842 must be within 1 mm. Also, the difference between the optical length from polarization beam splitter PBS3 to photodiode 851 and the optical length from splitter PBS3 to photodiode 852 must be within 1 mm. Therefore, in the known devices, adjustments of the optical axes and optical lengths are troublesome. This deteriorates reliability. Furthermore, it is difficult to make the device compact because optical fibers cannot be sharply bent due to their material.

SUMMARY OF THE INVENTION

It is an object of the present invention to improve reliability of an optical mixing device.

It is a further object of the present invention to simplify adjustment of an optical mixing device.

It is still a further object of the present invention to realize an optical mixing device that is easy to employ.

To achieve the above objects and in accordance with the purpose of the invention, as embodied and broadly described herein, the invention provides a device for mixing a first input optical signal and a second input optical signal. A separator receives the first and second input optical signals to separate each input optical signal into polarized optical signals having defined polarization planes which are different. The polarized optical signals are supplied to a mixer. Each polarized optical signal is divided into divided optical signals which are transmitted in directions with an acute crossed angle in the mixer. Then, mixed optical signals are produced by mixing the divided optical signals corresponding to the first and second input optical signals. Also, the mixed optical signals are focused.

BRIEF DESCRIPTION OF THE DRAWINGS

The present invention is best understood with reference to accompanying drawings in which.

DETAILED DESCRIPTION OF THE PREFERRED EMBODIMENT

Figure 1:
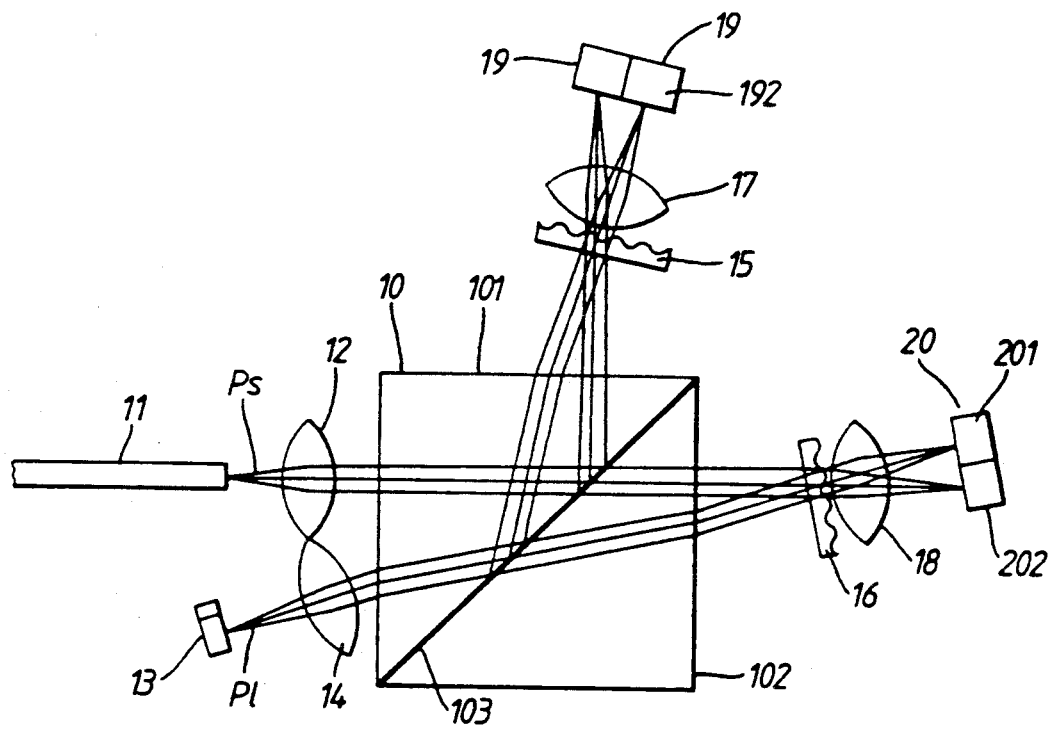
FIG. 1 is a schematic block diagram of an optical mixing device according to one embodiment of this invention.

Referring to the accompanying drawings, an embodiment of the present invention will be described. In the drawings, the same numerals are applied to similar elements, and therefore detailed descriptions thereof are not repeated.

As shown in FIG. 1, an optical mixing device includes a polarization beam splitter 10 as a polarization separating means. Polarization beam splitter 10 is formed by stacking first and second prisms 101 and 102 through a dielectric multilayer thin film 103. An input optical signal Ps transmitted from a signal source (not shown) is introduced in first prism 101 through an optical fiber 11 and a lens 12 for producing a beam of parallel radiation. A local oscillating optical signal source 13, which may comprise a semiconductor laser, etc., generates a local oscillating optical signal P1 to be introduced in first prism 101 through a lens 14 for producing a beam of parallel radiation. Optical signal P1 may be a linearly polarized optical signal or a circularly polarized optical signal. First prism 101 receives optical signals Ps and P1 at different angles of incidence. Each of optical signals Ps and P1 is separated into two polarized optical signals having substantially perpendicular polarization planes by polarization beam splitter 10. Source 13 and lens 14 are disposed so that the two polarized optical signals from P1 have the same intensity. One polarized optical signal from each of optical signals Ps and P1 is reflected by dielectric multilayer thin film 103 to be supplied to a transmitting type diffraction grating 15. The other polarized optical signal transmits through dielectric multilayer thin film 103 to be supplied to a transmitting type diffraction grating 16. Diffraction gratings 15 and 16 are disposed at positions where each of the pairs of two optical signals from polarization beam splitter 10 intersect.

Diffraction grating 15 diffracts each reflected optical signal from polarization beam splitter 10 to divide each signal into a 0 order optical signal and a diffracted optical signal with equal optical intensities. As a result, the 0 order optical signal corresponding to one of optical signals Ps and P1 is mixed with the diffracted optical signal corresponding to the other of optical signals Ps and P1. Also, diffraction grating 16 diffracts each transmitted optical signal from polarization beam splitter 10 to divide each signal into a 0 order optical signal and a diffracted optical signal with equal optical intensities. The 0 order optical signal corresponding to one of optical signals Ps and P1 is mixed with the diffracted optical signal corresponding to the other of optical signals Ps and P1. Mixed optical signals from diffraction gratings 15 and 16 are focused on first and second optical detecting modules 19 and 20 by lenses 17 and 18, respectively. Detecting modules 19 and 20 include a pair of detectors 191 and 192, and 201 and 202, respectively, to form a balanced receiver system.

Figure 2:
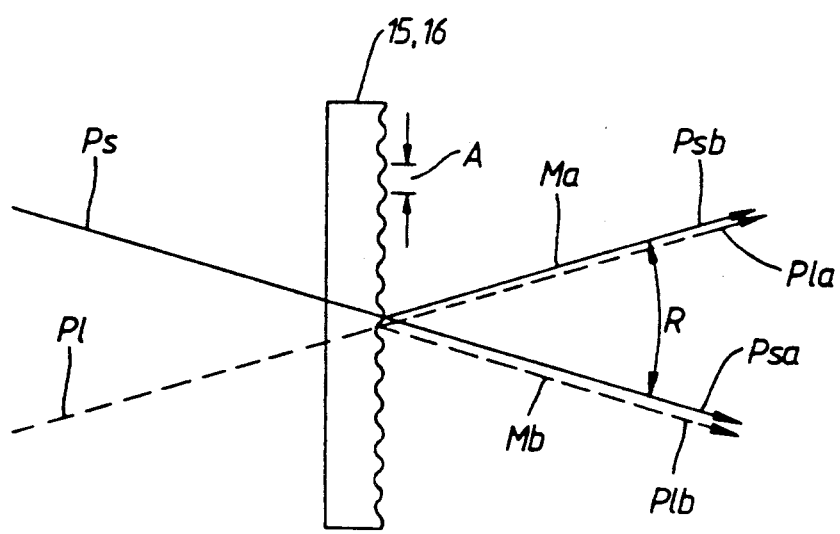
FIG. 2 shows a diffraction grating used in the device shown in FIG. 1 for explaining the operation of the present device.

In transmitting type diffraction gratings 15 and 16, as shown in FIG. 2, an optical signal corresponding to input optical signal Ps is diffracted to be divided into 0 order optical signal Psa and diffracted optical signal Psb. Also, an optical signal corresponding to local oscillating optical signal P1 is diffracted to be divided into 0 order optical signal Pla and diffracted optical signal Plb. Therefore, 0 order optical signal Psa and diffracted optical signal Plb are propagated in the same direction to produce mixed optical signal Ma. Diffracted optical signal Psb and 0 order optical signal Pla are propagated in the same direction with angle R to the direction of mixed optical signal Ma to produce mixed optical signal Mb. Transmitting type diffraction gratings 15 and 16 are formed so as to satisfy the following expression:

$$A = mk/\{2 \sin (R/2)\}$$

where A is the pitch of diffraction gratings 15 and 16, R is the angle between 0 order optical signal Psa or Pla and diffracted optical signal Psb or Plb, k is the wavelength of the optical signal, and m is the order of diffraction. If angle R is defined as a small value, diffraction gratings 15 and 16 are easy to produce since a large value of pitch A can be selected.

In the device shown in FIG. 1, input optical signal Ps and local oscillating optical signal Pl can be mixed with a high accuracy without optical coupling by optical fibers. Also, the polarization planes of optical signal components derived from signals Ps and Pl will always coincide the each of the mixed optical signals from diffraction gratings 17 and 18 without an adjuster for adjusting the polarization plane. The polarization plane of oscillating optical signal Pl is adjustable so that it can be divided into two polarized optical signals with substantially the same optical intensities by means of polarization beam splitter 10. Handling of the device, including all adjustments, is simplified because an error in the adjustment of the polarization plane is allowable to about 10 degrees.

Figure 3:
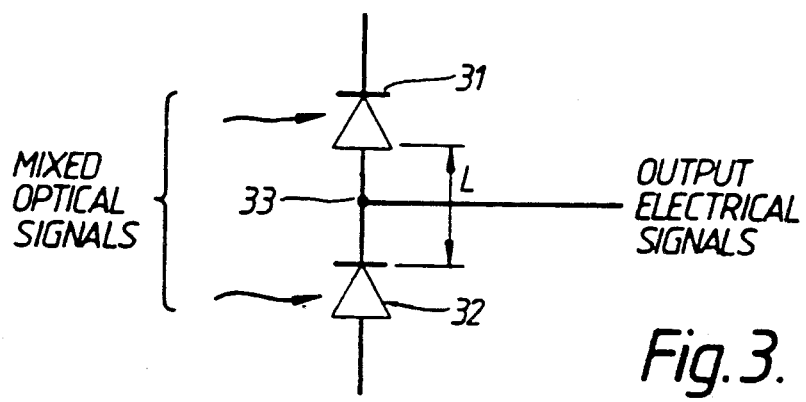
FIG. 3 shows a configuration of detectors in the device shown in FIG. 1.
Figure 4:
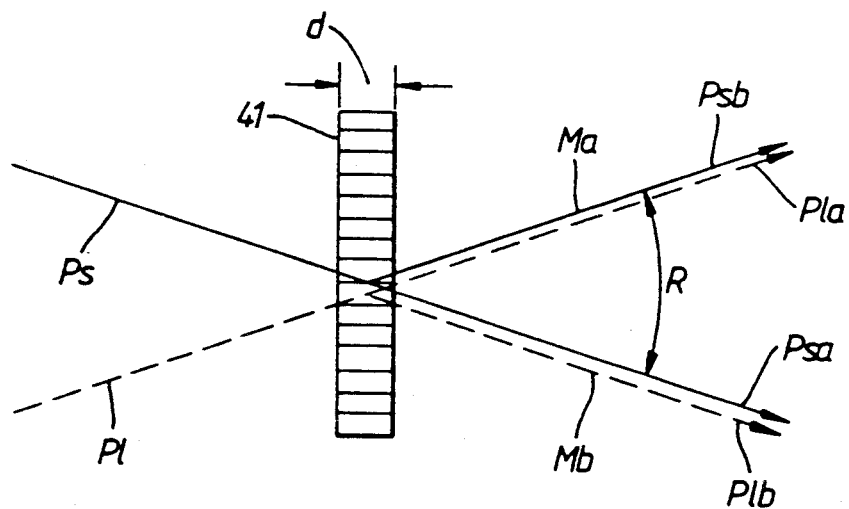
FIG. 4 shows another diffraction grating used in the device shown in FIG. 1.

Also, diffraction gratings 15 and 16 produce mixed optical signals in two directions with an acute crossed angle. Therefore, mixed optical signals from diffraction grating 15 or 16 can be focused on optical detecting module 19 or 20 by one lens 17 or 18, respectively. A pair of detectors 191 and 192, or 201 and 202, each pair of which is called a twin detector, includes photodetectors 31 and 32 connected in series, as shown in FIG. 3, to produce output electrical signals corresponding to mixed optical signals at a terminal 33. Photodetectors 31 and 32 can be arranged with distance L less than 1 mm. Thus, a pair of detectors 191 and 192 or 201 and 202 can be formed on one semiconductor chip to simplify the structure and to be suitable for a high speed optical communication system. The mixing of optical signals is stabilized relative to changes in temperature, because no optical fiber is employed. Also, the reliability of the device is improved due to the decrease in the number of optical couplings. Moreover, a pair of mixed optical signals from diffraction grating 15 or 16 is introduced to optical detectors 191 and 192 or 201 and 202 respectively, through the same optical length without any special adjustments. Each of diffraction gratings 15 and 16 can be replaced with a Bragg type diffraction grating 41, shown in FIG. 4, which comprises regions with high refractive index and low refractive index formed reciprocally in thickness d. In diffraction grating 41, where the diffraction of optical signals can be concentrated to a specified order, 0 order optical signal Psa or Pla and first order diffracted optical signal Psb or Plb are obtained effectively.

Figure 5:
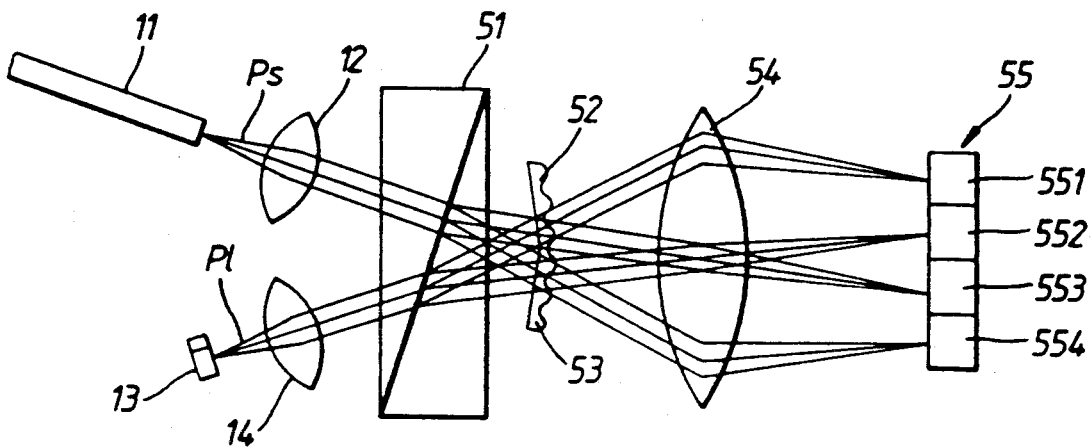
FIG. 5 is a schematic block diagram of an optical mixing device according to a further embodiment of this invention.

FIG. 5 shows an optical mixing device according to a further embodiment of this invention. The device includes an optical polarization beam splitter 51 comprising a Wollaston prism or a Rochon prism where both pairs of polarized optical signals corresponding to optical signals Ps and Pl are obtained from the same face of the prism. Again, the two polarized optical signals derived from Pl have the same magnitude. Transmitting type diffraction gratings 52 and 53 are disposed at positions where two polarized optical signals, corresponding to optical signals Ps and Pl, from optical polarization beam splitter 51, intersect. One lens 54 is also disposed to focus output optical signals from diffraction gratings 52 and 53 to an optical detecting module 55 which includes four detectors 551 to 554. Optical polarization beam splitter 51 can separate each of optical signals Ps and Pl into two polarized optical signals with different polarization planes to be propagated from the same face in two directions with an acute crossed angle. Therefore, diffraction gratings 52 and 53 can be closely disposed or formed together to provide output optical signals to one lens 54. Also, detecting module 55 can be formed on one semiconductor chip because four detectors 551 to 554 can be closely disposed. Thus, the device of FIG. 5 is more compact than that shown in FIG. 1.

Figure 6:
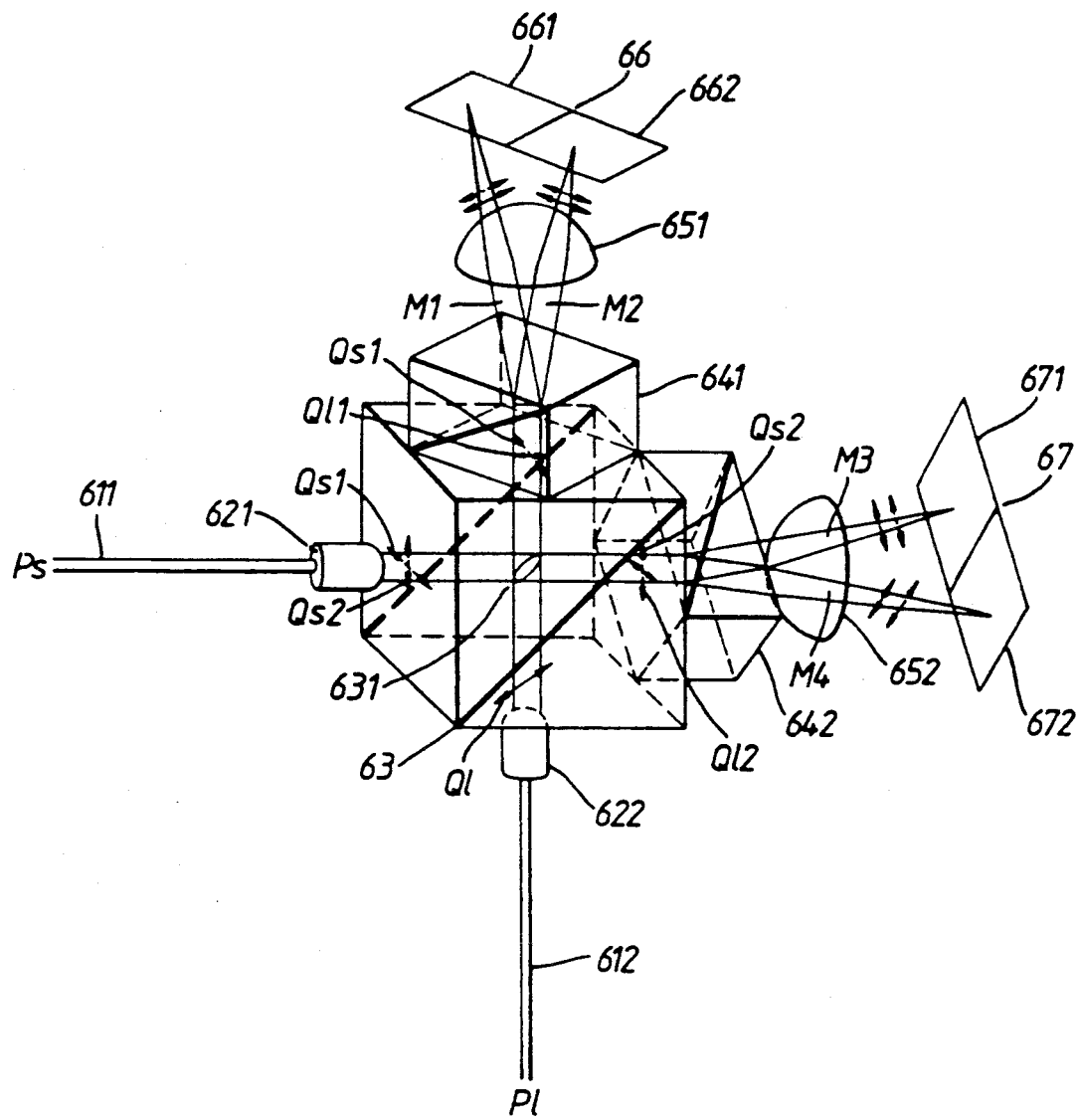
FIG. 6 shows a schematic configuration of an optical mixing device according to still a further embodiment of this invention.
Figure 7:
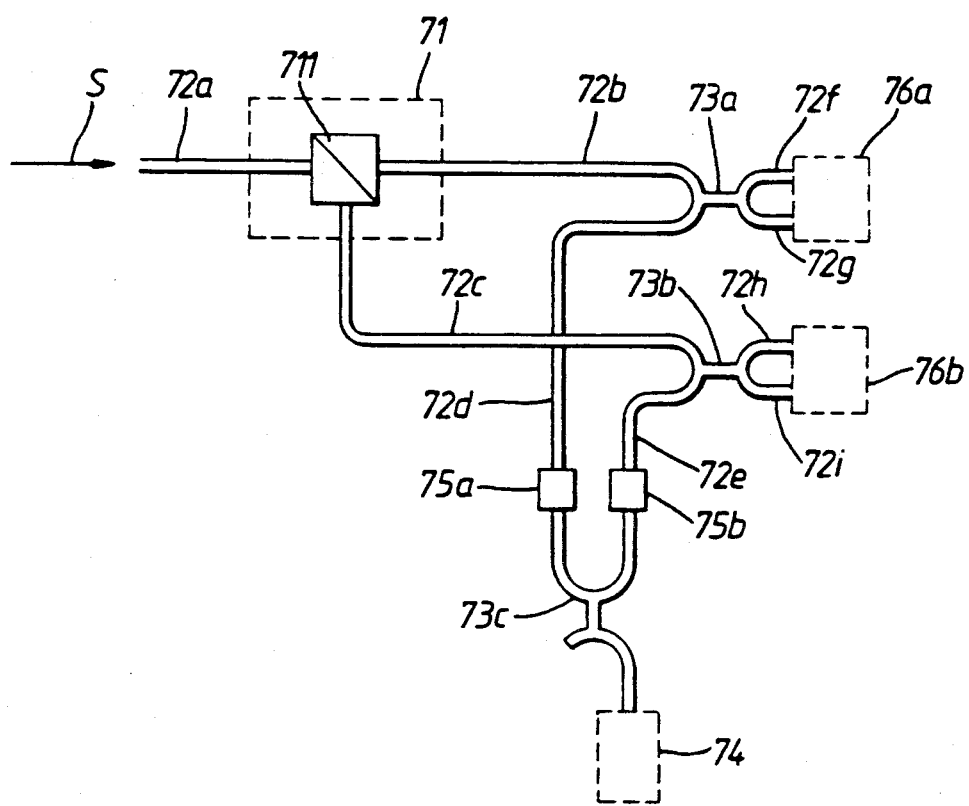
FIG. 7 is a block diagram of a known optical mixing device.
Figure 8:
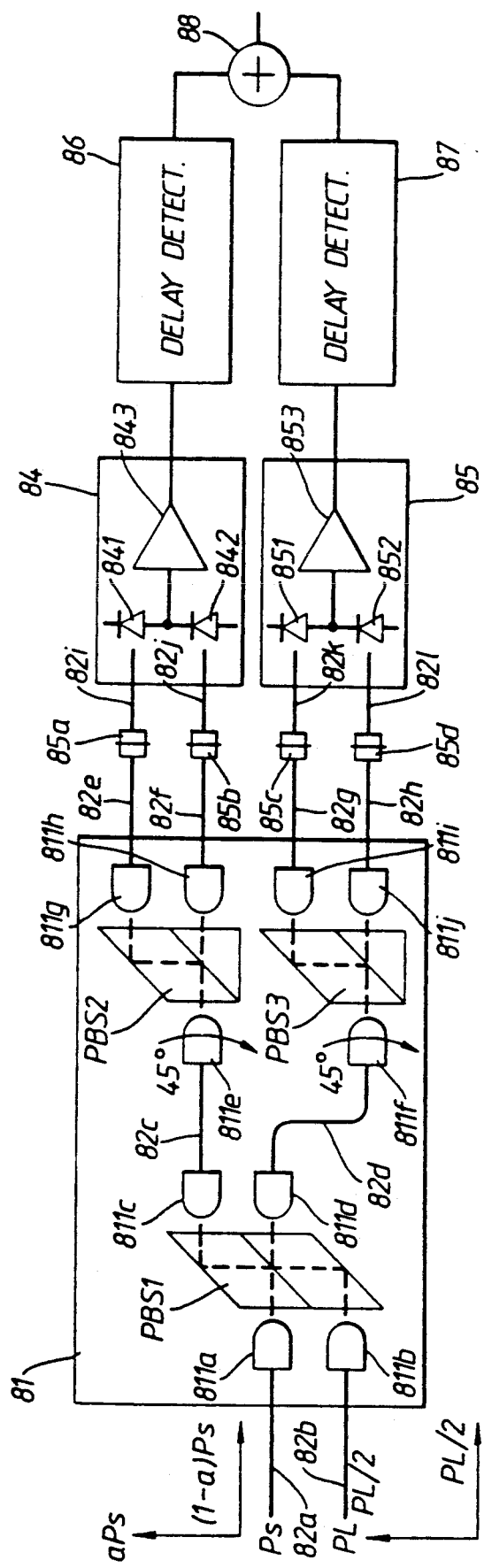
FIG. 8 is a block diagram of a known balanced polarization diversity receiver.

FIG. 6 shows still a further embodiment of this invention. An input optical signal Ps is supplied to a first polarization beam splitter 63 through an optical fiber 611 and a lens 621 for producing a beam of parallel radiation. Beam splitter 63 has a polarization separating plane 631 which can be formed by a dielectric multilayer thin film. A local oscillating optical signal Pl is also supplied to first polarization beam splitter 63 through an optical fiber 612 and a lens 622 for producing a beam of parallel radiation. First polarization beam splitter 63 separates each of optical signals Ps and Pl into two polarized optical signals having substantially perpendicular polarization planes. Positions of lenses 621 and 622 are adjusted so that optical signals Ps and Pl can cross on the same position on a polarization separating plane 631. The polarization plane of local oscillating optical signal Pl is adjusted so that linearly polarized optical signal Q1 would be propagated through lens 622 with its polarization plane inclined by 45° to that of the polarized optical signal to be separated in first polarization beam splitter 63. According to this adjustment, local oscillating optical signal Pl is separated by first polarization beam splitter 63 into two polarized optical signals Q11 and Q12, having substantially perpendicular polarization planes, with equal optical intensities. One linearly polarized optical signal Qs2 of input optical signal Ps transmits through polarization separating plane 631. The other linearly polarized optical signal Qs1 of input optical signal Ps is reflected by polarization separating plane 631. If optical signal Pl is a circularly polarized optical signal, the adjustment of the polarization plane of optical signal Pl is not necessary.

Each pair of polarized optical signals Qs1, Q11 and Qs2, Q12, corresponding to optical signals Ps and Pl, having substantially perpendicular polarization planes are mixed to be introduced in each of the second and third polarization beam splitters 641 and 642. Splitters 641 and 642 are formed so that each introduced optical signal will be divided into polarized optical signals with a separating angle between a few degrees and 60 degrees. Each of the splitters 641 and 642 is disposed so that an angle between polarization planes of output optical signals from splitter 63 and each of splitters 641 and 642 will be substantially at 45 degrees. Therefore, each of the polarized optical signals Qs1, Qs2, Q11, and Q12 from splitter 63 is divided into two polarized optical signals with equal optical intensity by splitters 641 and 642. Moreover, in splitter 641, each signal of two polarized optical signals derived from signal Qs1 is mixed with a signal derived from signal Q11 having the same plane of polarization. Splitter 642 also mixes polarized optical signals derived from signals Qs2 and Q12 in the same manner as splitter 641. Each of the two mixed optical signals (M1, M2) and (M3, M4) from splitters 641 and 642 are focused by each lens 651 and 652 to each optical detecting module 66 and 67. Module 66 or 67 includes a pair of optical detectors 661 and 662 or 671 and 672 which is formed as shown in FIG. 3.

The device shown in FIG. 6 has few portions coupled by optical fibers. Mixed optical signals M1, M2, M3 and M4 from splitters 641 and 642 are introduced to optical detectors 661, 662, 671 and 672 through lenses 651 and 652 without special adjustment for matching optical lengths. Splitters 641 and 642 may comprise a Wollaston prism or a Rochon prism formed by a crystal of rutile ($TiO_2$) etc. According to the present invention, it is possible to provide a compact optical mixing device having improved reliability and low optical coupling loss, which is adjusted and assembled simply, due to the few optical coupling portions using optical fibers. Therefore, it is possible with the present invention to provide an improved optical mixing device, applicable for a balanced polarization diversity system, that is suitable for a coherent optical communication system, for example.

What is claimed is:

1. A device for mixing a first input optical signal and a second input optical signal, comprising:
   polarization separating means for separating each of the first and second input optical signals into polarized optical signals having different polarization planes;
   first means for transmitting the first input optical signal into the polarization separation means;
   second means for transmitting the second input optical signal into the polarization separating means;
   mixing means, disposed to receive the polarized optical signals from the polarization separating means at a position where the polarized optical signals corresponding to the first and second input optical signals intersect, for dividing each of the polarized optical signals into two divided optical signals to be transmitted in directions with an acute crossed angle such that a first divided optical signal of a first polarized optical signal is transmitted in the same direction as a first divided optical signal of a second polarized optical signal and a second divided optical signal of the first polarized optical signal is transmitted in the same direction as a second divided optical signal of the second polarized optical signal, thereby mixing the divided optical signals corresponding to the first and second input optical signals to produce mixed optical signals;
   single focusing means for focusing at least two of the mixed optical signals; and
   detecting means for detecting focused optical signals from the focusing means.

2. The device of claim 1, wherein the polarization separating means includes:
   a first prism receiving the first and second input optical signals at different angles of incidence; and
   a second prism, connected to the first prism through a dielectric multilayer thin film, the second prism transmitting a polarized optical signal having one polarization plane and reflecting a polarized optical signal having another polarization plane.

3. The device of claim 1, wherein the polarization separating means includes means for dividing both the first and second input optical signals into the polarized optical signals having substantially perpendicular polarization planes.

4. The device of claim 1, wherein the mixing means includes a diffraction grating with a selected pitch where the optical signals are propagated in the directions with the acute crossed angle.

5. The device of claim 1, wherein the second transmitting means includes means for generating the second optical signal with its polarization plane adjusted so that the two polarized optical signals corresponding to the second input optical signal are divided with substantially the same optical intensities by the polarization separating means.

6. The device of claim 1, wherein the focusing means includes lens means for focusing the divided optical signals transmitted in the directions with the acute crossed angle from the mixing means.

7. The device of claim 1, wherein the mixing means includes means for concentrating diffraction of the polarized optical signals from the separating means to a specified order of diffraction.

8. The device of claim 1, wherein the separating means includes prism means for producing the polarized optical signals with different polarization planes in the same face of the prism means.

9. The device of claim 8, wherein the focusing means includes single lens means for focusing all mixed optical signals from the mixing means.

10. The device of claim 1, wherein the detecting means includes photodiodes for generating electrical signals corresponding to the focused optical signals.

11. A device for mixing a first input optical signal and a second input optical signal, comprising:
    first transmitting means for transmitting the first input optical signal;
    second transmitting means for transmitting the second input optical signal;
    separating means coupled to the first and second transmitting means for separating the first input optical signal into first and second polarized optical signals with substantially perpendicular polarization planes and also separating the second input optical signal into third and fourth polarized optical signals with substantially perpendicular polarization planes, the polarization plane of the third polarized optical signal being perpendicular to the polarization plane of the first polarized optical signal and the polarization plane of the fourth polarized optical signal being perpendicular to the polarization plane of the second polarized optical signal;
    first mixing means coupled to the first and third polarized optical signals for dividing each of the first and third polarized optical signals into two divided optical signals with substantially perpendicular polarization planes to be transmitted in directions with an acute crossed angle such that a first divided optical signal of the first polarized optical signal is transmitted in the same direction as a first divided optical signal of the third polarized optical signal and a second divided optical signal of the first polarized optical signal is transmitted in the same direction as a second divided optical signal of the third polarized optical signal, thereby mixing the divided optical signals, having substantially the same polarization plane, corresponding to the first and second input optical signals to produce first and second mixed optical signals;
    second mixing means coupled to the second and fourth polarized optical signals dividing each of the second and fourth polarized optical signals into two divided optical signals with substantially perpendicular polarization planes to be transmitted in directions with an acute crossed angle such that a first divided optical signal of the second polarized optical signal is transmitted in the same direction as a first divided optical signal of the fourth polarized optical signal and a second divided optical signal of the second polarized optical signal is transmitted in the same direction as a second divided optical signal of the fourth second polarized optical signal, thereby mixing the divided optical signals, having substantially the same polarization plane, corresponding to the first and second input optical signals to produce third and fourth mixed optical signals;

first single lens means for focusing the first and second mixed optical signals from the first mixing means;

second single lens means for focusing the third and fourth mixed optical signals from the second mixing means;

first detecting means for detecting the mixed optical signals from the first single lens means; and second detecting means for detecting the mixed optical signals from the second single lens means.

12. The device of claim 11, wherein the first and second detecting means includes photodiodes for generating electrical signals corresponding to the focused optical signals.

13. The device of claim 11, wherein the second transmitting means includes means for generating the second input optical signal with its polarization plane adjusted so that the third and fourth polarized optical signals are divided with substantially the same optical intensities by the separating means.

14. The device of claim 11, wherein each of the first and second mixing means includes means for producing the divided optical signals being transmitted with the crossed angle less than 60 degrees.

* * * * *